United States Patent [19]
Gray

[11] Patent Number: 5,675,636
[45] Date of Patent: Oct. 7, 1997

[54] ADAPTIVE METHOD FOR ALLOCATING CALLS

[75] Inventor: Thomas A. Gray, Carp, Canada

[73] Assignee: Mitel Corporation, Kanata, Canada

[21] Appl. No.: 426,960

[22] Filed: Apr. 24, 1995

[30] Foreign Application Priority Data

May 6, 1994 [CA] Canada ................... 2123068

[51] Int. Cl.⁶ .................................. H04M 15/00
[52] U.S. Cl. ..................... 379/114; 379/112; 379/115
[58] Field of Search ........................ 379/112, 114, 379/115, 130, 131, 120, 157, 111, 113

[56] References Cited

U.S. PATENT DOCUMENTS

| | | | |
|---|---|---|---|
| 4,972,464 | 11/1990 | Webb et al. | 379/112 |
| 5,289,536 | 2/1994 | Hokari | 379/221 |
| 5,291,550 | 3/1994 | Levy et al. | 379/113 |
| 5,400,395 | 3/1995 | Berenato | 379/114 |
| 5,425,085 | 6/1995 | Weinberger et al. | 379/112 |
| 5,473,630 | 12/1995 | Penzias et al. | 379/114 |
| 5,488,655 | 1/1996 | Hamlen | 379/112 |
| 5,528,678 | 6/1996 | Kaplan | 379/201 |
| 5,530,744 | 6/1996 | Charalambous et al. | 379/112 |
| 5,553,124 | 9/1996 | Brinskele | 379/112 |
| 5,553,131 | 9/1996 | Minervino Jr. et al. | 379/112 |
| 5,606,602 | 2/1997 | Johnson et al. | 379/114 |

FOREIGN PATENT DOCUMENTS

| | | | |
|---|---|---|---|
| WO94/28683 A1 | 8/1994 | WIPO | |
| WO94/13109 A1 | 9/1994 | WIPO | |

Primary Examiner—Curtis Kuntz
Assistant Examiner—Binh K. Tieu
Attorney, Agent, or Firm—Pascal & Associates

[57] ABSTRACT

A method of optimizing the cost of toll calls in a communication system comprised of providing a plurality of toll call plan costing agents, each representing a call completion plan having parameters relating to a minimal call cost and to the minimization of a total system cost of calling, detecting that a toll call is to be made and the parameters of the toll call, the call plan costing agents each calculating an estimate of a minimizing system toll call cost increment in the event its toll call plan is implemented for the call, bidding for the toll call by each of the costing agents by providing the estimated cost of the call and of the increment, selecting a suitable bid based on minimization of total system calls, and indicating to a call processor agent parameters of the selected toll call plan whereby the call can be completed in accordance with the selected plan.

21 Claims, 4 Drawing Sheets

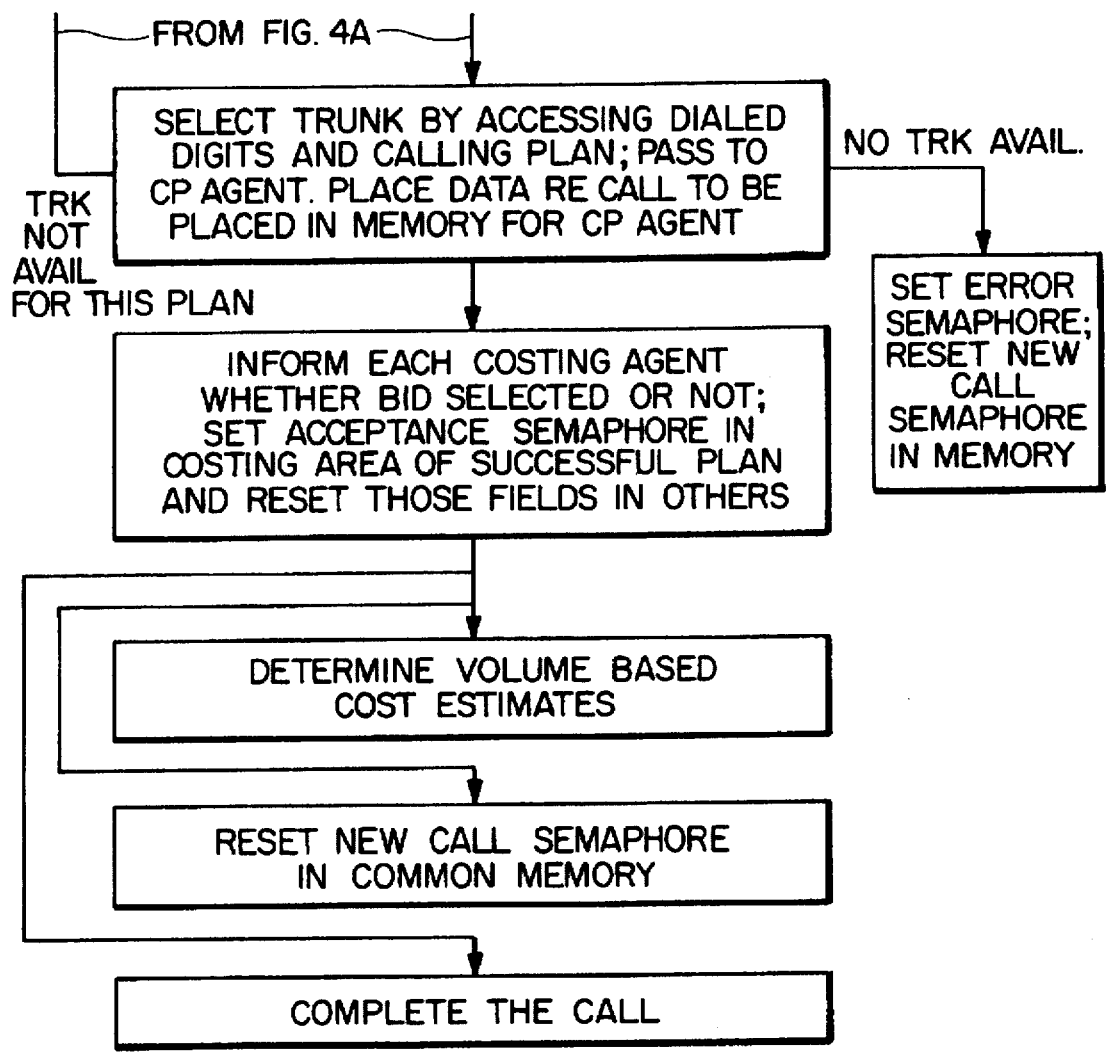

5,675,636

1
ADAPTIVE METHOD FOR ALLOCATING CALLS

FIELD OF THE INVENTION

This invention relates to communication switching systems, and in particular to methods for optimizing (e.g. minimizing) the cost of toll calls processed by the system.

BACKGROUND TO THE INVENTION

Today, there are many providers of long distance service, and these providers offer many discount plans having different characteristics. It is the task of a telecom manager to configure the telephone switch of his company to provide long distance service at the least cost by using the service of carrier in the most cost efficient manner. This task is made complex by the large number of possible carriers, and by their constantly changing service options.

It has been known to minimize the cost of each call by presenting to the telephone switch an estimated cost per call based on an absolute cost per unit time, e.g. cost per minute of a call, offered by a carrier, and to allow the switch to pick the minimum cost per call. Switches have performed this function to provide, for example, least cost routing of a call. However, the overall toll to the system cost could not be minimized where carriers provide for example flat rate charging for a fixed number of calls and then in one case a discount or in another case price per additional call over the fixed number. Thus call plans could not be selected on the basis of minimum total system cost of calling, and advantage could not be taken of plans wherein, for example, the cost per call of one carrier is higher but a discount is sufficiently high over a certain number of calls that the total system cost is lower given the number of calls typically made from the system.

In the past, the switch provided means for directing calls to certain carriers based on the time of day, the user's class of service and a variety of other constraints. These plans are commonly called routes, or route lists.

These plans are static. Any change in the commercial environment would mean the revaluation of the route plans and creation of more suitable ones. These plans also do not cover all possible considerations in all possible combinations. For example, call volume discounts are not normally considered. These plans also do not easily allow for the combination of multiple constraints which may produce savings, for example the comparison of a call volume discount on one plan compared to a location discount (for example discounts on calls to certain area codes).

SUMMARY OF THE INVENTION

The present invention, provides a method whereby the decision on call assignments to trunks is done dynamically, and not in response to a fixed plan.

The call assignment is performed on a bidding process. Bidding processes have been described in the publications "Negotiating Multimedia Telecommunications Sessions" by Michael Kramer et all, published in Bellcore Exchange, September/October 1992 pp. 24–28, "Blackboard Systems" by Daniel Corkill AI Expert, September 1991, pp. 41–47, "Blackboard System: The Blackboard Model of Problem Solving and the Evolution of Blackboard Architectures", by H. Penny Nii, The AI Magazine, Summer 1986, pp. 38–53, and in "Elevator Scheduling System Using Blackboard Architecture" by Grantham K. H. Pang, IEE Proceedings-D, vol. 138, No. 4, July 1991, pp. 337–346.

2

Service carriers and their service plans are represented by competing software program agents. These agents bid to have calls assigned to their trunks, by calculating the cost of the call according to the service plan they are offering, but not only calculating the cost of a call, but also the incremental minimizing cost to the system if the particular plans are implemented for the call.

An area in a shared memory is established where information about potential calls is placed, and where various service agents can place their bids. The bid preferably is comprised of two parts: an absolute cost of the call (normalized to a convenient calling period), and a decrease in cost of calls for this calling plan if this calling plan is selected. The bid may be comprised of the cost and the derivative of the cost for the call plan in question.

A selection agent selects the most suitable bid. The selection will not necessarily be of the. lowest cost bid for the specific call. Instead the bids describe the effect that the selection of this call plan will have on the total calling cost of the system. The call plan that will create the largest saving in total cost if selected is chosen.

More particularly, the cost of service on trunks that are leased from several carriers is highly varied due to the competitive nature of the interconnect network, and can depend on the type of call (e.g. facsimile, data, compressed voice, time of day, the volume of calling, the location to which the call is directed, and many other factors). The present invention provides a method of providing an adaptive, evolvable means of allocating calls to trunks so as to minimize the overall toll calling cost of the system to which those trunks are connected.

In accordance with an embodiment of the invention, a method of optimizing the cost of toll calls in a communication system is comprised of providing a plurality of toll call plan costing agents, each representing a call completion plan having parameters relating to a minimal call cost and to the minimization of a total system cost of calling, detecting that a toll call is to be made and the parameters of the toll call, the call plan costing agents each calculating an estimate of a minimizing system toll call cost increment in the event its toll call plan is implemented for the call, bidding for the toll call by each of the costing agents by providing the estimated cost of the call and of said increment, selecting a suitable bid based on minimization of total system calls, and indicating to a call processor agent parameters of the selected toll call plan whereby the call can be completed in accordance with the selected plan.

In accordance with another embodiment, a method of optimizing the cost of toll calls in a communication system, is comprised of detecting that a toll call is to be allocated to a trunk, placing data characterizing the call including a called number, and a new call semaphore in a shared memory, in response to the new call semaphore, notifying a plurality of call cost agents, each representing a toll call plan, of a request for a new call, the call cost agents accessing the data characterizing the call, the call cost agents estimating the cost of the call and a total system toll call cost decrease in the event the estimate is chosen, based on the toll call plan which it represents, each call cost agent bidding on the call based on its estimate, if possible, assessing the bids, and selecting a bid, representative of a toll call plan, based on a minimum total system toll call cost, and completing the call based on the toll call plan represented by the selected bid.

BRIEF INTRODUCTION TO THE DRAWINGS

A better understanding of the invention will be obtained by reading the description of the invention below, with reference to the following drawings, in which.

DETAILED DESCRIPTION OF THE INVENTION

Figure 1:
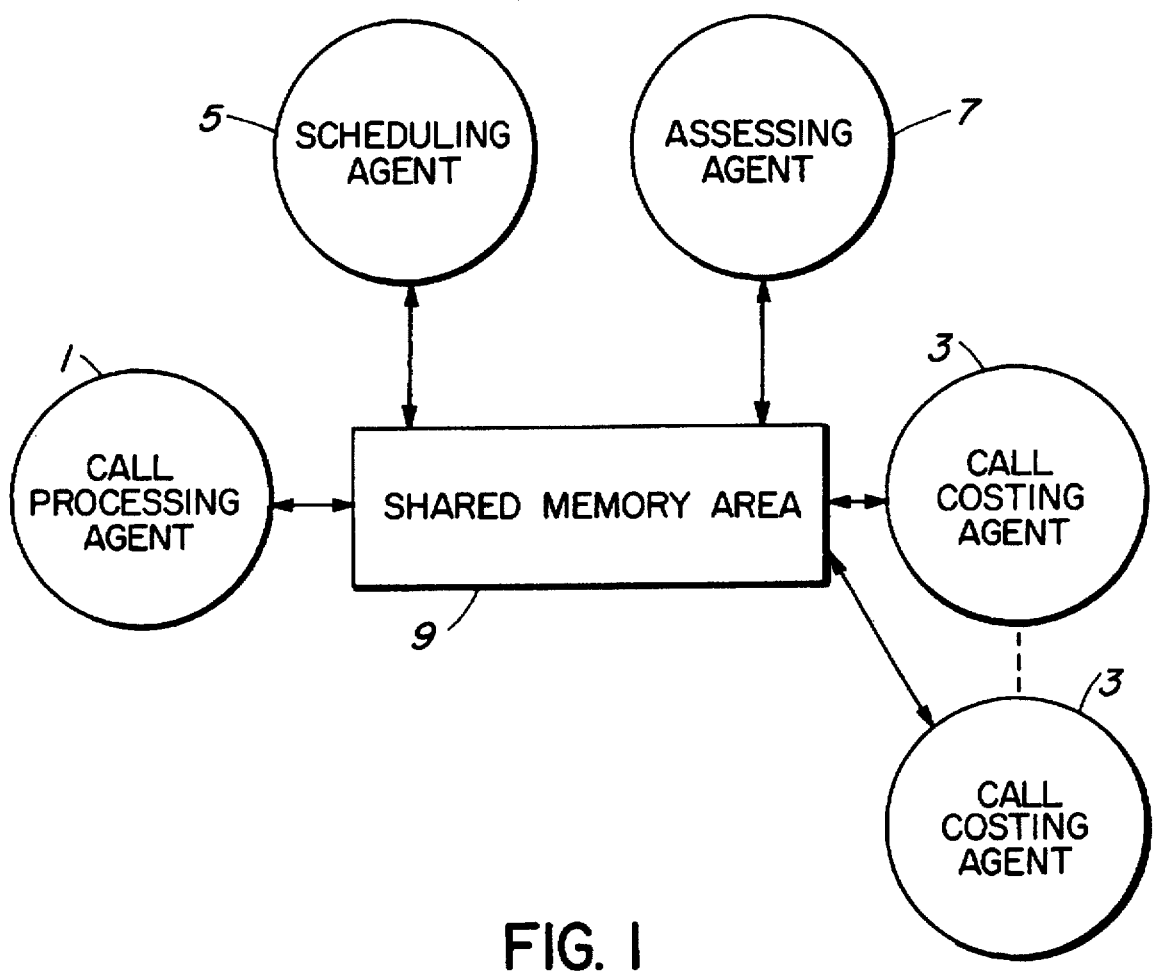
FIG. 1 is a block diagram illustrating relationships of elements used in the carrying out the preferred embodiment of the present invention.

Turning now to FIG. 1, a general block diagram illustrating relationships of various elements that can carry out the method of the invention. These elements are as follows.

A call processing agent 1, referred to below as a CP agent, represents a PABX or other switching system, and determines that a call must be presented to a trunk.

Each of plural costing agents 3 represents a specific communication signal carrier or carrier billing plan. These agents are responsible for determining the cost to the system of the plan they represent, for call assignment. These agents place bids representing the cost of the call if their specific plan is accepted. Each of the costing agents should use a costing procedure which is appropriate to the entity it represents.

A scheduling agent 5 sequences the activities of the other agents, i.e. coordinates the activities of the other agents by scheduling their activities. Otherwise, the scheduling system has no knowledge of the operation of the system.

An assessing agent 7 surveys the bids of the costing agents, and chooses the most appropriate bid. The selection of a bid may be based on a variety of rationales, but the overall goal is to lower the overall cost of calling from the PABX, and not necessarily to minimize the cost of an individual call.

Figure 2:
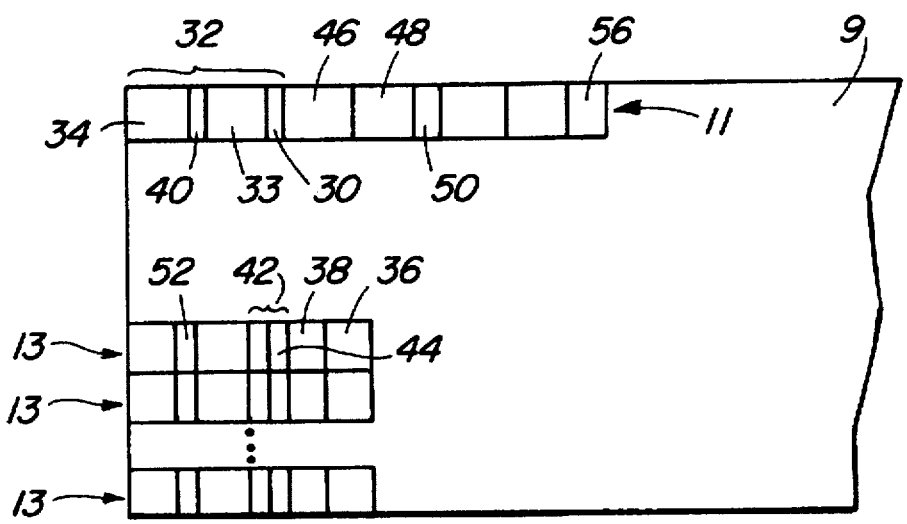
FIG. 2 is a block diagram illustrating content of a shared memory used to carry out the preferred embodiment of the invention.

A shared memory 9 is partitioned, and is used as a communication medium between the aforenoted agents. The memory is illustrated in FIG. 2, and has one partition area 11 which is defined as a new call area and another area 13 which contains plural costing agent areas. The new call area is used for communication between the CP agent and the assessing agent; the CP agent places a request for a call allocation to a trunk in area 11, and the assessing agent places a reply in this area as well. Each costing agent communicates information via its own costing agent area 13 with the assessing agent.

Figure 3:
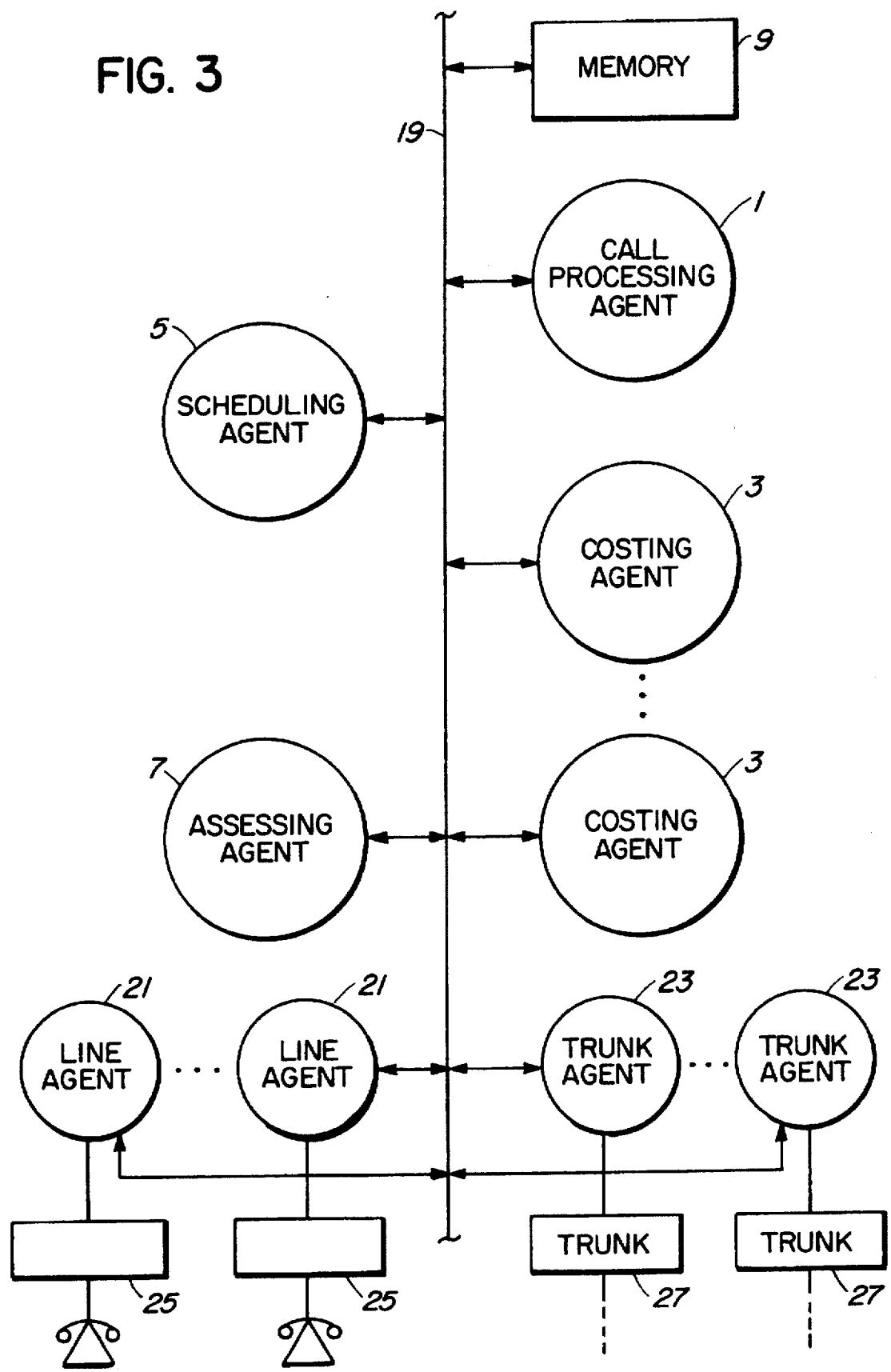
FIG. 3 is a block diagram illustrating the architecture of a hardware platform on which the present invention may be carried out, and FIGS. 4A and 4B, placed together as in FIG. 4C, is a flow chart illustrating an embodiment of the present invention.

In accordance with an embodiment of the invention, the data to be stored in the various areas is as follows:

In the new call area 11:
  Communicated From CP agent To Assessing Agent
  new call semaphore
  start assessment semaphore
  call identification (id)
  station id
  dialed digits
  type of call
  Communicated To CP from Assessing Agent
  call allocated semaphore
  call id
  call failure
  trunk id
  digits to be dialed
In each cost agent area:
  To and From the Costing Agent
  new bid request semaphore
  acceptance semaphore
  bid produced semaphore (i.e. bid, I am not bidding, no bid produced)
  cost of this call if my call is accepted
  cost increment if my call is accepted FIG. 3 illustrates a hardware architecture on which the present invention may be implemented. Shared memory 9 interfaces a local area network (LAN) 19. In addition each of the costing agents 3, scheduling agent 5, assessing agent 7 and call processing agent 1 interface the LAN, for communicating with the memory 9. Each of the agents may be a processor or a personal computer.

A call may be completed in one of several ways. A PABX may interface the LAN and receive control instructions e.g. to interconnect a line with a trunk from the CP agent 1 via the LAN. As another example, and as shown, individual line agents and trunk agents which represent and which may communicate with lines and trunks via line and trunk circuits 25 and 27 respectively, communicate with CP agent 1 and with shared memory 9 via LAN 19. Request for service signals are sent from a line circuit 25 via a corresponding line agent 21 to memory 9, where a signal is stored indicating that a call is to be allocated to a trunk, designated by a destination indicated by the dialed digits. Signals indicating that a trunk is to be seized are sent from the call processing agent via LAN 19 to a trunk agent 23, which causes a trunk 27 to be seized. The call processing agent then designates and communicates a time multiplexed channel to be used between line and trunk via LAN 19, or another time or space divided channel via another network which may include a switching matrix (not shown).

Figure 4A:
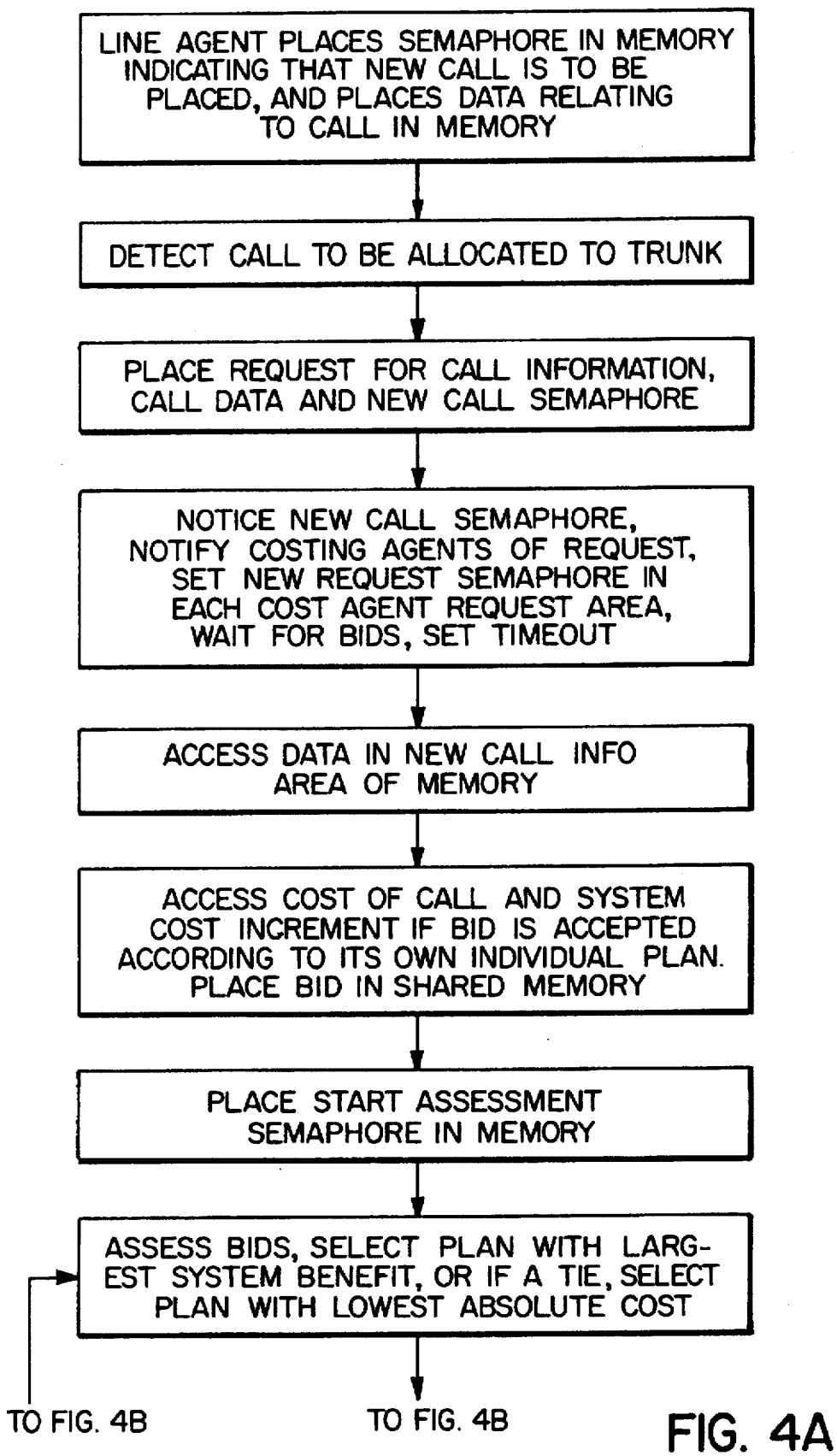

The invention operates as follows, with additional reference to the flow chart of FIGS. 4A and 4B.

(a) A line agent places a new call semaphore 30 in the shared memory 9 (see FIG. 2), indicating that a new call is to be placed.

(b) The CP agent 1 notices that the new call is to be allocated to a trunk. It places the request and call information for trunk allocation in the new call data area 32 of the shared memory and sets a new call semaphore 30. The new call data area is shown containing the new call data 32 related to the call, an identification 33 of which line has requested service, and the dialed digits 34.

(c) The scheduling agent 5, accessing memory 9, notices that the new call semaphore 30 has been set, and notifies all of the costing agents 3 of the request by setting the new request semaphore 36 in each of their respective areas 13 of shared memory 9. The scheduling agent now waits for the bids from the costing agents. To prevent system lockup in case of failure in the costing agents, the scheduling agent sets a timeout so that it will not wait forever due to a costing agent fault.

(d) All costing agents now begin to assess the cost of the call, by accessing the information in the new call area.

The costing agents should assess not only the cost of placing this specific call, but should calculate the cost decrease for the overall system if its bid is accepted. This is particularly important in the case of volume sensitive calls. If only the cost of an individual call is selected, a volume sensitive plan will always be at a disadvantage when compared to other plans. The volume sensitive plan needs to have some of its calls selected, in order to qualify for the discount. Several examples of how the assessment can be made will be found later below.

Each of these costing agents should use a plan that is the most suitable for the calling plan that it represents. It should be able to maintain and store its own information, such as the volume of calls selected under its plan. Selection of a particular plan is provided by the assessment agent setting an acceptance semaphore in the costing agent whose bid has been accepted.

For example certain plans offer discounts to specific numbers or area codes. The number or area code to which a call is to be made is obtained by the costing agents from the dialed digits field 34 of the new call data record 32. A type of call field 40 in the new call data record can be encoded to represent many different types of calls, such as normal voice calls, voice calls where compression is allowed, data calls, facsimile calls etc. By the costing agent 3 reading this record, it can use the type of call data to determine cost of call and system cost decrease if its plan is accepted.

The agent can also know that the performance of its carrier is unsuitable for this service and so produce no bid. For.example, it may be known that certain routes on specific carriers are too noisy for reliable data or FAX operation. The agent could ignore or place a high bid for this call.

In order to have the costs generated by the costing agents to be meaningful, they should all relate to the same basis, i.e. be normalized. One method of normalization is to use a cost per unit time, such as cost per minute, as the basis. Other costing comparisons may be used in certain circumstances.

For volume sensitive calls, special costing techniques may be used. For example, a discount may be offered by a carrier service if more than 1000 calls are placed per month. Thus the cost would be N for each of the first 1000 calls and some lesser amount M for any call thereafter. The cost decrease method can be used to ensure that the potential cost saving if more than 1000 calls are made, is considered when costing is considered. Strictly speaking there will be a cost decrease only when the 1001th call is placed. However in order to obtain this cost decrease, a strategy should be used to ensure that the potential is realized.

For example, one strategy that could be used would be to reflect the potential cost decrease at the next cost break point for every call up to that point. The cost decrease bid for this example would be N–M for each call up to 1000, and zero decrease for all calls thereafter. This would have the effect of driving the usage of a volume sensitive calling plan until it reaches the lowest cost possible. It also has the effect of decreasing the bidding advantage of such plans for additional calls if no significant decrease is available at further breakpoints.

Another strategic technique could be used, such as fitting the cost of a plan to a continuous curve which approximates the call plan, and use the derivative of this curve as the potential cost decrease.

In some cases a carrier may offer a flat rate for a particular number of calls per trunk, and a per call charge for any calls in excess of that amount. In this case, instead of a discount being provided for volume, a penalty is applied. It is of advantage to the user of these trunks to ensure that all trunks are utilized for their maximum number of flat rate calls before any per call charges are encountered.

The volume sensitive strategy described above is applicable to this situation. Clearly, calls have been paid for in advance up to a certain maximum. Thus utilizing all these paid for calls will result in the maximum cost reduction possible for the user company, and the incremental cost of the calls will be zero. The agent for such plans can therefore report a cost decrease of maximum and an absolute cost of zero for all calls until the maximum flat rate number of calls has been reached. After that occurrence, the cost decrease reported will be zero, and the absolute cost will be the actual normalized cost of the call.

When a costing agent has finished its calculation of cost of call and system cost decrease if its plan is accepted, it places its bid in bid data area 42 in its shared memory area 13, and sets its bid produced semaphore 44.

The bid can be of several types: (i) a standard bid of (normalized) absolute cost for the call and (normalized) cost decrease if the bid is accepted, (ii) a no bid indicator, which can occur if the agent is representing a plan keyed to certain call types or destinations. A bid of "not bidding" should be produced in this case. If the costing agent does not produce a bid after an allocated time period, the scheduling agent should place a "no bid produced" indicator in the bidding area 42, to indicate failure.

(e) When all costing agents have placed a bid, or if the bidding time out has expired, the scheduling agent sets a start assessment semaphore 46 in the new call area of shared memory 9.

(f) The assessment agent 7, noticing the start assessment semaphore, begins to select appropriate calling plan from the various bids. From the costing agents that have submitted a bid, it selects the calling plan that has the largest decrease on the total cost of toll calling from the system (e.g. PABX). It does this by comparing the cost decrease predicted by each plan's agent if that plan is selected, and selects the plan with the largest decrease. If more than one plan qualifies, it selects the qualified plan with the lowest absolute cost.

(g) With the calling plan selected, the assessment agent 7 selects the appropriate trunk by accessing both the dialed digits and the calling plan data, and passes this information to the CP agent 1. The information is comprised of trunk and dialing information such as the digits to be dialed, tones to be detected, etc. The digits to be dialed and tones to be detected is placed in the digits to be dialed field of the new call area 11, and can include prefix digits, etc., designating a particular carrier. The identification of the selected trunk to carry out the calling plan is also placed in a trunk field 50.

The assessing agent 7 should also inform each of the costing agents 3 if its bid has been selected or not, by setting an acceptance semaphore 52 in the costing agent area 13 that has presented the accepted bid. The assessing agent 7 should also reset this field in the corresponding costing agent areas 13 relating to the unaccepted bids. This semaphore is provided so that the costing agent can determine volume based cost estimates, since the number of accepted bids will often determine volume based call pricing.

The assessment agent also indicates that the call has been completely serviced by resetting the new call semaphore 30 in the new call area 11.

If no trunks that are compatible with the selected calling plan are available, the assessment process in part (f) above is performed again, with the previously chosen plan excluded. Trunk selection is again performed. The assessment procedure continues, excluding the previously selected plans, until a suitable trunk is found.

If no trunk is available in any plan, a call failure indication is returned to the PABX by the CP agent, or, in the apparatus shown in FIG. 3, a facilities agent (not shown) is instructed by the CP agent to provide a failure tone to the line via the line agent. An error semaphore 56 is reset in the new call area 11, as well as the new call semaphore 30.

(h) In case that a trunk is available, the trunk agent is instructed by the AP agent to seize the trunk, and as described earlier, the call is completed. Alternatively, the data relating to the call is sent to the PABX agent (not shown) to cause the data to be sent to the PABX, whereby the PABX accepts the trunk choice and dialing information, and completes the call. If call failure is returned by the assessment agent, the appropriate call failure signal is returned to the calling subscriber by the PABX.

In the case of communication of the control data from the CP agent to a PABX, instead of using the system using line and trunk agents as shown, the PABX can be connected via one or more personal computer servers to the LAN 19. In another embodiment, the CP agent can be connected within the PABX, and sends its request as a message on the LAN to the PC agent. The scheduling and assessing agent can also be physically merged with the CP agent within a personal computer. The costing agents may also be located within the same personal computer, or may be distributed in other personal computers connected to the same LAN.

Alternatively, the agents can be implemented as processes within software programs within the PABX. Each agent in this case is an independent process which communicates with the rest by reading and writing from a defined area of a memory of a control computer for the PABX.

A person understanding this invention may now conceive of alternative structures and embodiments or variations of the above. All of those which fall within the scope of the claims appended hereto are considered to be part of the present invention.

I claim:

1. A method of optimizing the cost of toll calls in a communication system comprising:
   (a) providing a plurality of toll call plan costing agents, each representing a call completion plan having parameters relating to a minimal call cost and to the minimization of a total system cost of calling,
   (b) detecting that a toll call is to be made and the parameters of the toll call,
   (c) the call plan costing agents each calculating an estimate of a minimizing system toll call cost increment in the event its toll call plan is implemented for the call,
   (d) bidding for the toll call by each of the costing agents by providing the estimated cost of the call and of said increment,
   (e) selecting a suitable bid based on minimization of total system calls, and
   (f) indicating to a call processor agent parameters of the selected toll call plan whereby the call can be completed in accordance with the selected plan.

2. A method as defined in claim 1 in which the call plan costing agents each calculate an estimate of the cost of the call, and in the event more than one of the minimizing system toll call cost increments are the same from plural costing agents, selecting a bid from those costing agents that have the same minimizing system toll call cost increments on the basis of the minimum one of the estimated costs of the call.

3. A method as defined in claim 1, in which the estimated call cost and of the minimizing system toll call cost increments are normalized.

4. A method as defined in claim 1, in which the normalized estimated call cost and of the minimizing system toll call cost increments are predetermined cost per minute of call.

5. A method as defined in claim 1 in which a call completion plan is comprised of a flat rate of N for a first predetermined number of calls and a lesser cost M per first predetermined number of calls, whereby a corresponding bid by a costing agent for said minimum system toll call cost increments for said first predetermined number of calls is N−M, and is zero for all calls in excess of said predetermined number of calls.

6. A method as defined in claim 1 in which a call completion plan is comprised of a normalized cost fitted to a continuous curve which approximates the call completion plan, and in which said minimum system toll call cost increments is the derivative of said curve.

7. A method as defined in claim 1 in which a call completion plan is comprised of a flat rate for a first predetermined number of calls and a per call charge for calls in excess of that number of calls, in which a corresponding bid by a costing agent is zero for the cost per call for said first predetermined number of calls, and for the calls in excess of said predetermined number and absolute cost per call normalized to the cost of the call and a system cost decrease per call of zero.

8. A method as defined in claim 1, including
   (f) providing a call processing agent for indicating that a toll call is to be made,
   (g) providing an assessing agent for selecting said suitable bid plan, and
   (h) providing a scheduling agent for controlling the steps of the method, and providing notification of the request for call completion for receipt by the costing agents.

9. A method as defined in claim 6 in which parameters relating to a call to be completed, said notification of the request, data relating to bids from the costing agents and selection of a suitable bid are stored in a memory shared by said agents.

10. A method of optimizing the cost of toll calls in a communication system, comprising:
    (a) detecting that a toll call is to be allocated to a trunk,
    (b) placing data characterizing the call including a called number, and a new call semaphore in a shared memory,
    (c) in response to the new call semaphore, notifying a plurality of call cost agents, each representing a toll call plan, of a request for a new call,
    (d) the call cost agents accessing the data characterizing the call,
    (e) the call cost agents estimating the cost of the call and a total system toll call cost decrease in the event the estimate is chosen, based on the toll call plan which it represents,
    (f) each call cost agent bidding on the call based on its estimate, if possible,
    (g) assessing the bids, and selecting a bid, representative of a toll call plan, based on a minimum total system toll call cost, and
    (h) completing the call based on the toll call plan represented by the selected bid.

11. A method as defined in claim 10, including informing each call cost agent whether or not its bid has been selected, and the call cost agent determining subsequent call costs at least partly based on whether sufficient bids have been accepted in access of at least one cost breakpoint.

12. A method as defined in claim 11, including timing each of the call cost agents, and imposing a no bid condition on a call cost agent in the event the time out period has elapsed with no bid provided.

13. A method as defined in claim 11, including providing a no bid response from a call cost agent in the event its call plan cannot provide the type of call requested.

14. A method as defined in claim 10, including determining whether a trunk is available conforming to the call plan related to the accepted bid, and in the event it is not available, reassessing all bids except for the accepted bit to accept a new bid.

15. A method of optimizing the cost of toll calls in a communication system, including repeating the step defined in claim 14 repeatedly until it has been determined that there is not trunk available for implementation of any plan, and then providing an error signal to the calling line.

16. A method as defined in claim 15, including timing each of the call cost agents, and imposing a no bid condition on a call cost agent in the event the time out period has elapsed with no bid provided.

17. A method as defined in claim 15, including providing a no bid response from a call cost agent in the event its call plan cannot provide the type of call requested.

18. A method as defined in claim 10 in which a call completion plan is comprised of a flat rate of N for a first predetermined number of calls and a lesser cost M per first predetermined number of calls, whereby a corresponding bid by a costing agent for said minimum system toll call cost increments for said first predetermined number of calls is N−M, and is zero for all calls in excess of said predetermined number of calls.

19. A method as defined in claim 10 in which a call completion plan is comprised of a normalized cost fitted to a continuous curve which approximates the call completion plan, and in which said minimum system toll call cost increments is the derivative of said curve.

20. A method as defined in claim 10 in which a call completion plan is comprised of a flat rate for a first predetermined number of calls and a per call charge for calls in excess of that number of calls, in which a corresponding bid by a costing agent is zero for the cost per call for said first predetermined number of calls, and for the calls in excess of said predetermined number and absolute cost per call normalized to the cost of the call and a system cost decrease per call of zero.

21. A method as defined in claim 10 in which a first call completion plan is comprised of a flat rate of N for a first predetermined number of calls and a lesser cost M per first predetermined number of calls, whereby a corresponding bid by a costing agent for said minimum system toll call cost increments for said first predetermined number of calls is N−M, and is zero for all calls in excess of said predetermined number of calls, in which a second call completion plan is comprised of a normalized cost fitted to a continuous curve which approximates the call completion plan, and in which said minimum system toll call cost increments is the derivative of said curve, and in which a third call completion plan is comprised of a flat rate for a first predetermined number of calls and a per call charge for calls in excess of that number of calls, in which a corresponding bid by a costing agent is zero for the cost per call for said first predetermined number of calls, and for the calls in excess of said predetermined number and absolute cost per call normalized to the cost of the call and a system cost decrease per call of zero.

* * * * *